United States Patent Office 2,756,264
Patented July 24, 1956

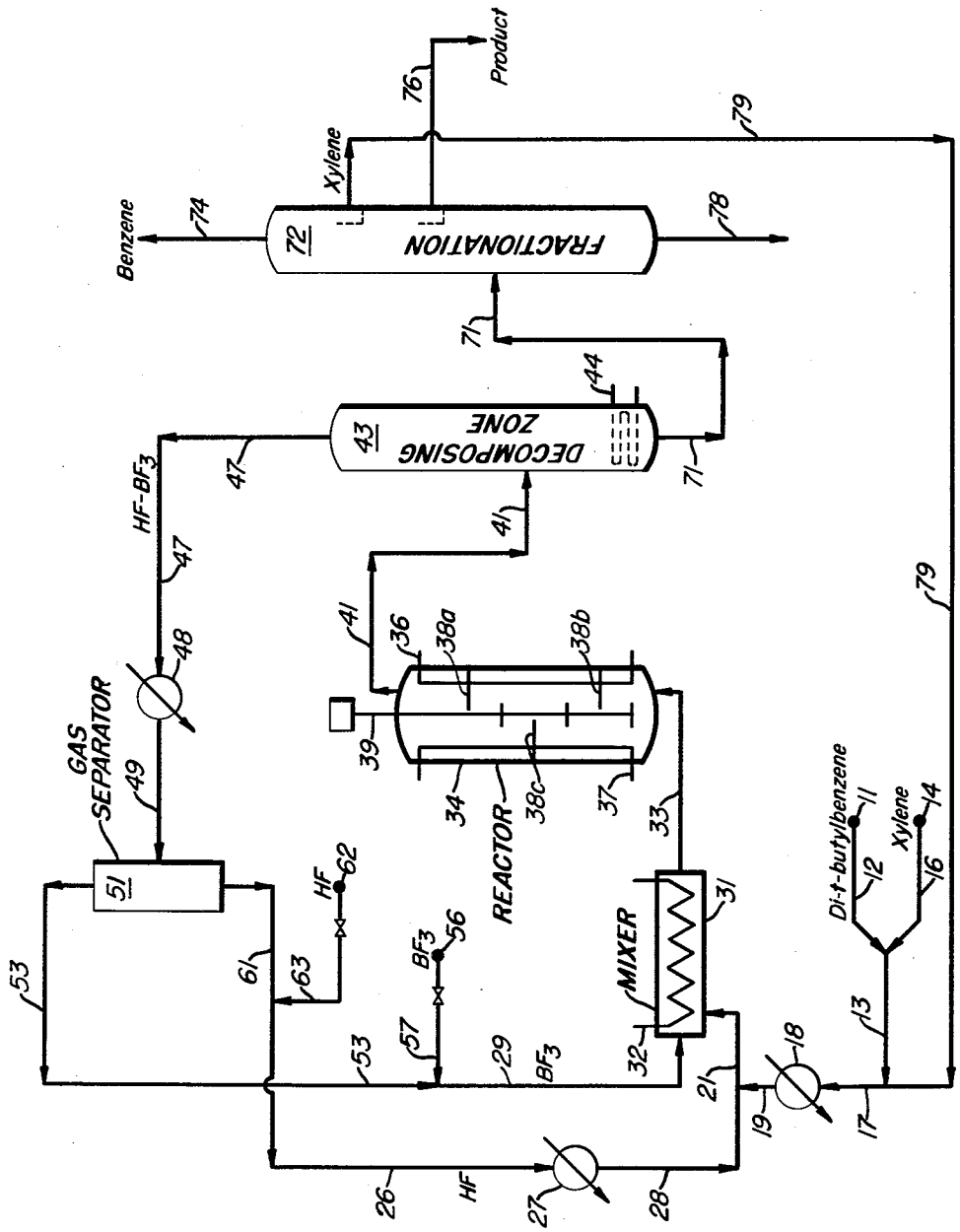

2,756,264
TERTIARY BUTYLXYLENE PRODUCTION

David A. McCaulay, Chicago, Ill., and Arthur P. Lien, Highland, Ind., assignors to Standard Oil Company, Chicago, Ill., a corporation of Indiana Application November 17, 1953, Serial No. 392,584

14 Claims. (Cl. 260—671)

This invention relates to the production of tertiary butylxylene, i. e., t-butyldimethylbenzene. More particularly the invention relates to the production of essentially pure 1,3,5-t-butylxylene.

The preparation by the chemical industry of particular compounds in very high purity has resulted in a demand for individual alkylbenzenes. Those possessing the symmetrical configuration, i. e., 1,3,5-alkylbenzenes are particularly desired. The tertiary butylxylenes are in demand and the preferred isomer is the 1,3,5-t-butylxylene.

It is an object of this invention to produce tertiary butylxylenes. Another object is the preparation of the symmetrical 1,3,5-t-butylxylene. A particular object is the preparation of 1,3,5-t-butylxylene in very high yield. Still another object is a process for the preparation of essentially pure 1,3,5-t-butylxylene by the interaction of a t-butylbenzene with any one or a mixture of the isomers of xylene.

High purity 1,3,5-tertiary butylxylene, i. e., 1-t-butyl-3,5-dimethylbenzene, is prepared by interacting xylene and a tertiary butylbenzene, either the mono, the di-, or the tri-derivative; a mol ratio of xylene to alkyl groups in the butylbenzene of at least about 1 is used. The interaction is carried out in the presence of at least enough liquid HF to form a separate acid phase and at least about 1 mol of $BF_3$ per mol of alkyl groups in said butylbenzene. The mixture of feed and $HF\text{-}BF_3$ agent is maintained at a temperature of not more than about $+25°$ C. for a time sufficient for the formation of a reaction product containing a tertiary butylxylene fraction which consists of high purity 1,3,5-isomer. A product hydrocarbon mixture is obtained by removing the HF and the $BF_3$ and high purity 1,3,5-t-butylxylene is recovered from the product mixture, preferably by distillation.

As used herein, interaction involves 2 alkylbenzenes containing different alkyl groups reacting to transfer an alkyl group from 1 alkylbenzene to the other alkylbenzene to form an alkylbenzene containing at least 2 different alkyl groups. Disproportionation as generally understood differs from interaction in that the 2 alkylbenzenes involved in the reaction contain the same alkyl groups; thus disproportionation involves the reaction of 2 alkylbenzenes containing the same alkyl groups wherein an alkyl group is transferred from 1 alkylbenzene to the other alkylbenzene to produce an alkylbenzene containing more alkyl groups than are present in the parent alkylbenzenes.

To illustrate: The process of this invention involves the interaction of xylene and a t-butylbenzene to form t-butylxylene and benzene. In the absence of xylene, t-butylbenzene undergoes a disproportionation to produce di-t-butylbenzene, tri-t-butylbenzene and benzene.

The tertiary butylbenzene component of the feed to the process is a member selected from the class consisting of tertiary butylbenzene, di-tertiary butylbenzene, tri-tertiary butylbenzene and mixtures thereof. It is preferred to use the t-butylbenzene and di-t-butylbenzenes.

The other component of the feed is at least 1 xylene isomer, preferably meta-xylene.

In addition to the xylene and t-butylbenzene, the feed may contain hydrocarbons which are inert to the action of the $HF\text{-}BF_3$ agent and also do not participate to any appreciable extent in interaction with either xylene or t-butylbenzene. In general, the alkylbenzenes other than xylene and t-butylbenzene can participate to some extent in interaction with xylene or t-butylbenzene.

Benzene is a by-product of the interaction process of this invention. The presence of added benzene in the feed has no significant adverse effect on the direction of the interaction; however, the presence of large amounts of added benzene in the feed slows down the rate of interaction.

Paraffins, particularly the lower boiling paraffins, do not in themselves have an adverse effect on the interaction. Owing to their low solubility in the acid phase, the presence of more than a small amount of paraffins, e. g., 3%, in the feed results in the presence of a second hydrocarbon phase in the reaction zone. The presence of a second hydrocarbon phase in the reaction zone has an adverse effect on the rate of interaction.

It is preferred to operate under conditions of feed composition and amounts of liquid HF and $BF_3$ usage such that essentially a single homogeneous liquid phase exists in the reaction zone.

The feed to the interaction process should contain xylene and t-butylbenzene in a mol ratio of xylene to alkyl groups, i. e., t-butyl, of at least about 1; preferably the mol ratio should be at least 1. The presence of t-butyl groups in an amount in excess of the ability of the xylene present to accept them and to form t-butylxylene results in the production of disproportionation products of the t-butylbenzene. While these poly-t-butylbenzenes can be recycled to the interaction process, it is wasteful and therefore the use of an excess of t-butyl groups should be avoided. The interaction between t-butylbenzenes and xylene proceeds very rapidly to the desired t-butylxylene even at low xylene to t-butyl group ratios. It is unnecessary to operate with an extremely large excess of xylene in the feed. The preferred mol ratio of xylene to alkyl groups in the t-butylbenzene charged is between about 1.1 and 1.6.

To illustrate: When the reactive components in the feed consists essentially of xylene and mono-t-butylbenzene, the preferred mol ratio of xylene to mono-t-butylbenzene is between about 1.1 and 1.6. When the reactive components in the feed are essentially xylene and di-t-butylbenzene, the preferred mol ratio of xylene to di-t-butylbenzene is between about 2.2 and 3.2. When the reactive components in the feed are essentially xylene and tri-t-butylbenzene, the preferred mol ratio of xylene to tri-t-butylbenzene is between about 3.3 and 4.8.

The process is carried out under substantially anhydrous conditions. The liquid hydrogen fluoride used should contain not more than about 2 or 3% of water. Commercial grade anhydrous hydrofluoric acid is suitable.

Enough liquid HF must be present in the reaction zone to form a separate distinct acid phase. More than this amount is desirable; usually between about 3 and about 50 mols of liquid HF are used per mol of xylene charged. The preferred usage of liquid HF is between about 5 and 20 mols per mol of xylene charged.

Boron trifluoride, i. e., $BF_3$, must be present in the reaction zone in at least a catalytically effective amount, for example, 0.1 mol per mol of t-butyl groups charged. In order to maximize the yield of t-butylxylene, at least 1 mol of $BF_3$ should be used per mol of t-butyl groups charged. More than this amount of $BF_3$ has a favorable influence on the interaction. The more xylene complex appearing in the acid phase, the greater the solubility of other aromatic hydrocarbons and paraffins in the acid phase. Thus, when it is desired to reduce or even eliminate the presence of a second hydrocarbon phase in the reaction zone, at least about 1 mol of $BF_3$ is used per mol of xylene charged. The preferred $BF_3$ usage is between at least 1 and about 1.5 mols per mol of xylene charged.

The interaction is carried out at a temperature of not more than about $+25°$ C. Operation at this temperature for times in excess of about 60 minutes or for shorter times at higher temperatures results in a considerable amount of side reaction products which appear to be condensed ring compounds. The interaction may be carried out at temperatures as low as $-75°$ C. It is preferred to operate the process at a temperature between about $0°$ and about $+15°$ C.

The interaction rate is favorably influenced by higher temperatures. Thus, at a temperature of about $25°$ C. the interaction of meta-xylene and t-butylbenzene will proceed to essentially pure 1,3,5-t-butylxylene within a minute or so. At $-75°$ C. several hours are needed for the essentially complete conversion of the t-butyl groups to the 1,3,5-t-butylxylene. Operation in the preferred temperature range of between about $0°$ and $+15°$ C. with meta-xylene as the xylene isomer charged is relatively independent of the time of contacting; the preferred range of contacting times at the preferred temperature is between about 5 and about 30 minutes.

When the feed contains a xylene isomer other than meta-xylene or a mixture of meta-xylene and at least 1 other isomer, at short contacting times the t-butylxylene produced is a mixture of tri-alkylbenzene isomers. However, the symmetrical 1,3,5-tri-alkylbenzene is the most stable isomer. The other isomers isomerize to the 1,3,5 configuration. The isomerization is relatively slow at the comparatively low temperature utilized in this interaction process. When the feed contains ortho-xylene, para-xylene, mixtures thereof, or mixtures of meta-xylene and at least 1 other xylene isomer, it is necessary to extend the contacting time beyond those times given above, in order to produce a t-butylxylene fraction consisting of high purity 1,3,5-t-butylxylene. The term "high purity" is intended to mean a fraction containing at least about 95 mol percent of the 1,3,5-t-butylxylene and the remainder other t-butylxylene isomers. When operating with a feed containing ortho and/or para-xylene, a t-butylxylene fraction consisting of high purity 1,3,5-t-butylxylene is obtainable by operating for about 30 hours at about $0°$ C. or for about 10 hours at about $+15°$ C. That is, the lower the temperature, the longer the time needed, to produce a high purity 1,3,5-t-butylxylene fraction. By operating for a sufficiently long time an essentially pure 1,3,5-t-butylxylene is obtainable when the feed contains ortho and/or para-xylenes. In order to reduce the contacting time to a minimum, the preferred xylene feed to the interaction process is essentially pure meta-xylene.

Even when two distinct liquid phases are present in the reaction zone, the t-butylxylene product is found almost entirely in the acid phase. The t-butylxylene is present in the acid phase in the form of a complex containing 1 mol of $BF_3$ and, probably, 1 mol of HF per mol of t-butylxylene. The excess xylene is present in the acid phase to a large extent in the form of an HF—$BF_3$ complex.

The reaction product mixture may be recovered from the acid phase by various methods. Probably the simplest procedure and one most suitable for laboratory work consists of adding the acid phase to crushed ice or the acid phase may be contacted with cold aqueous alkaline solution, such as sodium hydroxide, potassium hydroxide and ammonia. It is desirable to prevent rearrangement reactions by the use of a cold aqueous reagent.

The hydrocarbons originally present in the acid phase appear as an upper oil layer above a lower aqueous layer. The upper oil layer may be separated by decantation and may be treated with dilute aqueous alkaline solution to remove any remaining HF and $BF_3$ occluded therein.

Both HF and $BF_3$ are relatively expensive chemicals and it is desirable in an economic process to recover these and to recycle them for reuse in the process. The HF and the $BF_3$ may be readily removed from the acid phase by heating the acid phase or by applying a vacuum thereto. The HF and the $BF_3$ distill overhead and may be recovered for reuse in the process. When di-alkylbenzenes and/or tri-alkylbenzenes are the principal complex-forming hydrocarbons, the complex may be decomposed at relatively low temperatures, such as $+20°$ C., by the use of vacuum distillation.

When using distillative decomposition procedure, it is necessary to consider the residence time of the complex in the decomposing zone as a part of the contacting time. Also, it is necessary to consider the temperature maintained in the decomposing zone when a particular product or a particular ratio of products is desired. Generally the temperature in the decomposing zone should be no higher than the maximum to be used in the reaction zone. The distillative decomposing zone may be operated at temperatures as low as about $-20°$ C. by the use of high vacuum therein. Herein, it is preferred to operate at about $+20°$ C. and to use a vacuum or a low boiling inert paraffin, such as propane, as a stripping aid.

ILLUSTRATIVE EMBODIMENT

The annexed figure, which forms a part of this specification, shows an illustrative embodiment of a method of carrying out the invention to produce essentially pure 1,3,5-t-butylxylene by treating a feed consisting of di-t-butylbenzene and xylene. The figure is schematic and many items of equipment have been omitted, such as pumps, valve, etc., as these may be readily added thereto.

Di-t-butylbenzene from source 11 is passed by way of line 12 into line 13. Meta-xylene from source 14 is passed by way of line 16 into line 13. The contents of line 13 are passed into line 17, where recycled xylene is also present. From exchanger 18 the feed is passed by way of line 19 into line 21. The mol ratio of xylene to di-t-butylbenzene is 2.4; 1.2 mols of xylene per mol of t-butyl groups.

Anhydrous liquid hydrogen fluoride, 9 mols/mol of charge, is passed from line 26, through heat exchanger 27 and line 28 into line 21. Heat exchangers 18 and 27 bring the temperature of the charge and the liquid HF to a temperature of about $0°$ C. This temperature is about $15°$ C. lower than the desired reaction temperature of $+15°$ C.

The contents of line 21 are introduced into mixer 31 which is provided with heat exchanger means 32. $BF_3$, 1.3 mols/mol of xylene in the feed, from line 29 is introduced into mixer 31. Mixer 31 is an apparatus able to rapidly intermingle the charge, liquid HF and $BF_3$. The heat exchanger means 32 withdraws the heat given off by the complex formation and prevents the temperature at the discharge end of mixer 31 rising above $+15°$ C.

An acid phase consisting of liquid HF, dissolved complex, hydrocarbons and BF3 is discharged from mixer 31. About 100 p. s. i. g. of pressure are maintained on the system to keep the excess BF3 in the acid phase. The mixture is pased from mixer 31 by way of line 33 into reactor 34.

Reactor 34 is provided with heat exchanger means 36 and 37. To insure the maintenance of a substantially uniform temperature of $+15°$ C. throughout the reactor, reactor 34 is provided with baffles 38a, 38b and 38c and motor driven agitator means 39.

An essentialy single acid phase is withdrawn from the top of reactor 34 and is passed by way of line 41 into decomposing zone 43. The interaction starts as soon as the HF, BF3 and feed are mixed and continues until the HF and BF3 are distilled from the acid phase. Therefore, the contacting time is measured as the time in mixer 31, reactor 34 and part of the total time in decomposing zone 43. In this embodiment, a total time of about 10 minutes is utilized.

Decomposing zone 43 is provided with internal heater 44 and some fractionation means, not shown. A temperature of $+20°$ C., under vacuum, in zone 43 readily decomposes the HF—BF3 complexes but does not cause appreciable loss due to side reactions.

HF vapor and BF3 gas are withdrawn from zone 43 and passed by way of line 47 into heat exchanger 48. In heat exchanger 48 the HF vapors are condensed and a liquid-gas stream is passed by way of line 49 into gas separator 51. BF3 is withdrawn from gas separator 51 and is recycled by way of lines 53 and 29 into mixer 31. Make-up BF3 is introduced from source 56 by way of valved line 57 into line 53. Liquid HF is recycled by way of lines 61 and 26. Make-up HF is introduced from source 62 by way of valved line 63 into line 61.

The bottoms fraction from decomposing zone 43 consists of benzene, xylene, 1,3,5-t-butylxylene and some higher boiling material. The bottoms fraction is withdrawn and introduced by way of line 71 into fractionation zone 72, shown schematically herein. A benzene fraction is withdrawn to storage by way of line 74. A product fraction consisting of essentially pure 1,3,5-t-butylxylene is passed to storage by way of line 76. A bottoms fraction of higher boiling material is withdrawn by way of line 78. A xylene fraction is withdrawn and recycled to the reactor by way of line 79, etc.

*Examples*

The results obtainable by the invention are illustrated by the following examples: The runs were carried out using a carbon steel reactor provided with a 1725 R. P. M. stirrer. The agent and reactants were added in the following order: (1) the alkyl group donor, (2) the alkyl group acceptor m-xylene, (3) commercial grade anhydrous HF and (4) commercial grade BF3.

The contents of the reactor were agitated during the addition of the HF and BF3. The contacting was continued at about constant temperature for the desired time.

The contents of the reactor were withdrawn into a vessel filled with crushed ice. An upper hydrocarbon layer formed over an aqueous layer. The hydrocarbon layer was decanted and washed with dilute ammonium hydroxide solution to remove HF and BF3. The hydrocarbons were then water washed to remove ammonium hydroxide.

The hydrocarbon mixture was fractionated in a distillation column providing about 30 theoretical plates. Each product fraction was analyzed by a combination of boiling point, specific gravity, refractive index, ultraviolet and infrared spectra.

The detailed results of the interaction of xylene and di-t-butylbenzene, isopropylbenzene and ethylbenzene, respectively, are shown in Table I. Runs with isopropylbenzene and ethylbenzene are shown for comparison.

TABLE

| Run No. | 1 | | 2 | | 3 | |
|---|---|---|---|---|---|---|
| Charge: | | | | | | |
| Donor, type | Ethylbenzene | | Isopropylbenzene | | p-di-t-butylbenzene | |
| | mols | Percent | mols | Percent | mols | Percent |
| Donor | 1.60 | 33.3 | 0.91 | 33 | 0.53 | 25 |
| m-xylene | 1.60 | 33.3 | 1.85 | 67 | 1.62 | 75 |
| p-xylene | 1.60 | 33.3 | ---- | | ---- | |
| Xylene/donor alkyl groups, ratio | 2.00 | | 2.03 | | 1.53 | |
| HF, mols | 60.0 | | 35.0 | | 25 | |
| BF3, mols | 5.1 | | 3.6 | | 2.0 | |
| HF/xylene, ratio | 18.7 | | 18.9 | | 15.4 | |
| BF3/xylene, ratio | 1.59 | | 1.95 | | 1.23 | |
| Temperature, °C | +21 | | +11 | | +7 | |
| Time, minutes | 30 | | 30 | | 15 | |
| Product recovery, wt. percent | ---- | | 91 | | 91 | |
| Reaction Product Mixture, mol percent: | | | | | | |
| Benzene | 16.7 | | 26.1 | | 22.6 | |
| m-xylene | 52.1 | | 45.6 | | 23.6 | |
| p-xylene | 12.6 | | ---- | | ---- | |
| Alkylbenzene | 4.0 | | 2.2 | | 0.0 | |
| m-di-alkylbenzene | 14.6 | | 1.1 | | 0.0 | |
| 1,3,5-alkylxylene | 0.0 | | 22.1 | | 51.8 | |
| 1,3,5-tri-alkylbenzene | 0.0 | | 2.9 | | 0.0 | |
| Higher boiling | ---- | | ---- | | 2.0 | |

Run 3 shows that p-di-t-butylbenzene and m-xylene interact to produce pure, within analytical error, 1,3,5-t-butylxylene in extremely high yield. No detectable amount of disproportionation products, such as mono-t-butylbenzene were formed. Even at $+7°$ C., some side reactions took place and formed a slight amount of higher boiling material. The substantially 100% yield of t-butylxylene is very surprising since di-t-butylbenzene, in the absence of xylene, disproportionates with extreme speed to the tri- and mono-derivatives.

Run 1 shows that ethylbenzene does not interact with xylene under conditions very similar to those of Run 3. The 14° higher temperature and doubled time in Run 1 favor rearrangement reaction and it is amazing that no ethylxylene was formed—85% of the ethylbenzene disproportionated to pure m-diethylbenzene.

Run 2 shows that under comparative conditions, isopropylbenzene not only interacts with xylene but also disproportionates. Here about 95% of the isopropylbenzene was converted. More than two-thirds of the conversion involved interaction to isopropylxylene; the remainder involved disproportionation to both the m-di-isopropylbenzene and 1,3,5-tri-isopropylbenzene. No material boiling above the tri-isopropylbenzene was formed.

These runs indicate that, in the presence of xylene and under comparable conditinos, ethylbenzene, isopropylbenzene and t-butylbenzene behave in an unpredictably different fashion.

Thus having described the invention, what is claimed is:

1. An interaction process which comprises contacting, under substantially anyhydrous conditions, a feed comprising (a) xylene and (b) a member selected from the class consisting of tertiary-butylbenzene, di-tertiary-butylbenzene, tri-tertiary-butylbenzene and mixtures thereof, as essentially the only reactive components, in a mole ratio of xylene to alkyl groups in said butylbenzene of at least 1, with at least enough liquid HF to form a separate acid phase and with at least 1 mol of BF3 per mol of alkyl groups in said butylbenzene, at a temperature of not more than about $+25°$ C. for a time sufficient for the formation of a fraction consisting of high purity, 1,3,5-tertiary-butylxylene, removing HF and BF3 from an acid phase to recover a product hydrocarbon mixture and recovering therefrom a fraction consisting of high purity 1,3,5-tertiary-butylxylene.

2. An interaction process which comprises contacting, under substantially anhydrous conditions, a feed comprising essentially (a) xylene and (b) a member selected from the class consisting of t-butylbenzene, di-t-butylbenzene, tri-t-butylbenzene and mixtures thereof, as essentially the only reactive components, in a mol ratio of xylene to alkyl groups in said butylbenzene of at least 1, with between about 3 and 50 mols of liquid HF and at least 1 mol of $BF_3$, respectively, per mol of said xylene, at a temperature of not more than about $+25°$ C. for a time sufficient for the formation of a fraction consisting of high purity 1,3,5-t-butylxylene, removing HF and $BF_3$ to recover a product hydrocarbon mixture and recovering therefrom a fraction consisting of high purity 1,3,5-t-butylxylene.

3. The process of claim 2 wherein said xylene is selected from the class consisting of o-xylene, p-xylene and mixtures thereof.

4. The process of claim 3 wherein said temperature is between about $0°$ and $+15°$ C. and said time is between about 10 and 36 hours, the longer time corresponding to the lower temperatures.

5. The process of claim 2 wherein said xylene is essentially m-xylene.

6. The process of claim 5 wherein said temperature is between about $0°$ and $+15°$ C. and said time is between about 5 and about 30 minutes.

7. The process of claim 2 wherein said ratio of xylene to alkyl groups is between about 1.1 and 1.6.

8. The process of claim 2 wherein said HF usage is between about 5 and 20 mols.

9. The process of claim 2 wherein said $BF_3$ usage is between at least 1 and about 1.5 mols.

10. An interaction process which comprises contacting, under substantially anhydrous conditions, a feed consisting essentially of meta-xylene and di-t-butylbenzene in a mol ratio of at least 2 with between about 5 and 20 mols of liquid HF and at least 1 mol of $BF_3$, respectively, per mol of said xylene, at a temperature between about $-75°$ and about $+25°$ C. for a time between 1 and 12 hours, the longer times corresponding to the lower temperatures, removing HF and $BF_3$ and recovering from a product hydrocarbon mixture a fraction consisting essentially of 1,3,5-t-butylxylene.

11. The process of claim 10 wherein said butylbenzene is the para isomer.

12. The process of claim 10 wherein said ratio of xylene to butylbenzene is between about 2.2 and 3.2.

13. The process of claim 10 wherein said $BF_3$ usage is between at least 1 and about 1.5 mols.

14. The process of claim 10 wherein said temperature is between about $0°$ and $+15°$ C. and said time is between about 5 and about 30 minutes.

References Cited in the file of this patent

UNITED STATES PATENTS

| | | |
|---|---|---|
| 2,385,524 | Mattox | Sept. 25, 1945 |
| 2,420,073 | Frey | May 6, 1947 |
| 2,648,713 | Schneider | Aug. 11, 1953 |
| 2,661,382 | Lien et al. | Dec. 1, 1953 |